Nov. 14, 1944.  W. E. STEEN  2,362,778
HIGH PRESSURE METER
Original Filed Aug. 1, 1940  2 Sheets-Sheet 1

Inventor
William E. Steen.

Attorneys.

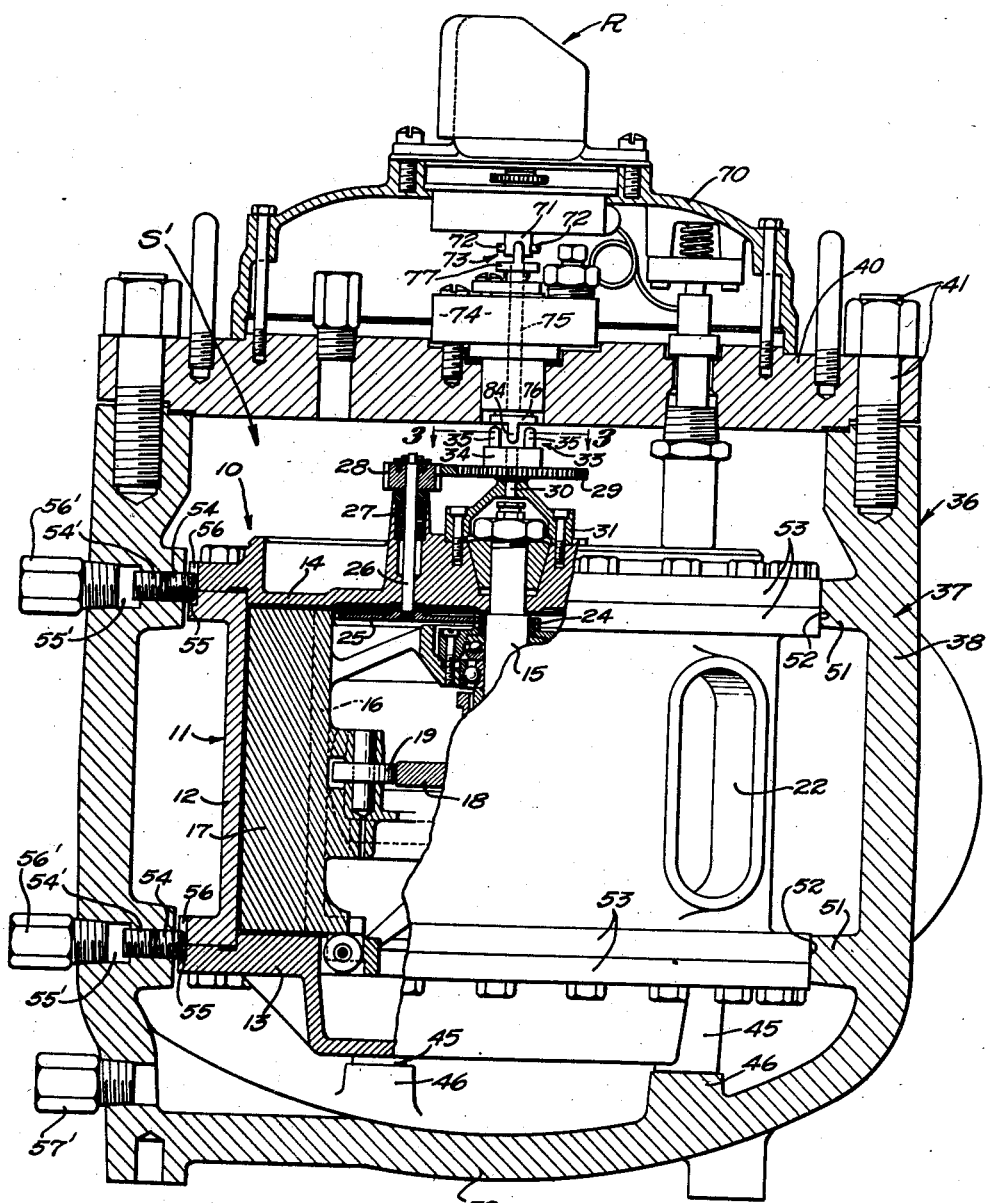

Patented Nov. 14, 1944

2,362,778

UNITED STATES PATENT OFFICE 2,362,778

HIGH-PRESSURE METER

William E. Steen, Pasadena, Calif., assignor to Smith Meter Company, Los Angeles, Calif., a corporation of California Original application August 1, 1940, Serial No. 349,367. Divided and this application July 21, 1942, Serial No. 451,707

1 Claim. (Cl. 73—259)

This invention relates to meters for measuring the flow of fluids, and is more particularly concerned with a construction which adapts said meters for safe, efficient operation under high pressures.

While the invention is in no way limited thereto, it is useful with particular advantage in connection with meters for measuring the flow of highly volatile fluids, such as gasoline.

This application is a division of my copending application entitled Spindle packing, filed Aug. 1, 1940, Serial No. 349,367, issued Sept. 22, 1942 as Patent No. 2,296,542.

In essence, the invention involves the use of a double-walled housing, with the measuring chamber and rotor mechanism, proper, contained within the inner wall with the provision of means for operatively connecting the rotor mechanism to the recording or registering mechanism mounted on the outside of the outer housing. By this expedient, a standard meter adapted to withstand usual pressures, may be mounted bodily within the bore of an outer, heavy casing, the housing of the standard meter providing the inner wall of the double-walled structure.

The measuring chamber and flow channel are provided within the inner housing (that is, the housing of the standard meter) but the inlet to the flow chamber opens to the space between housing walls. The outlet from the flow channel opens directly to the main outlet of the outer casing, but there is provided a spring loaded valve between the outlet side of the flow channel of the standard meter and the space between housings, so, in the event the rotor mechanism becomes jammed or in any way retarded in its rotation, the fluid may by-pass that mechanism through the space between housings.

Other objects and features of novelty will be made apparent in the following detailed description, reference being had to the accompanying drawings, in which:

Fig. 2 is a section on line 2—2 of Fig. 1, showing certain of the parts in elevation;

Fig. 3 is an enlarged, fragmentary section on line 3—3 of Fig. 2.

Figure 1:
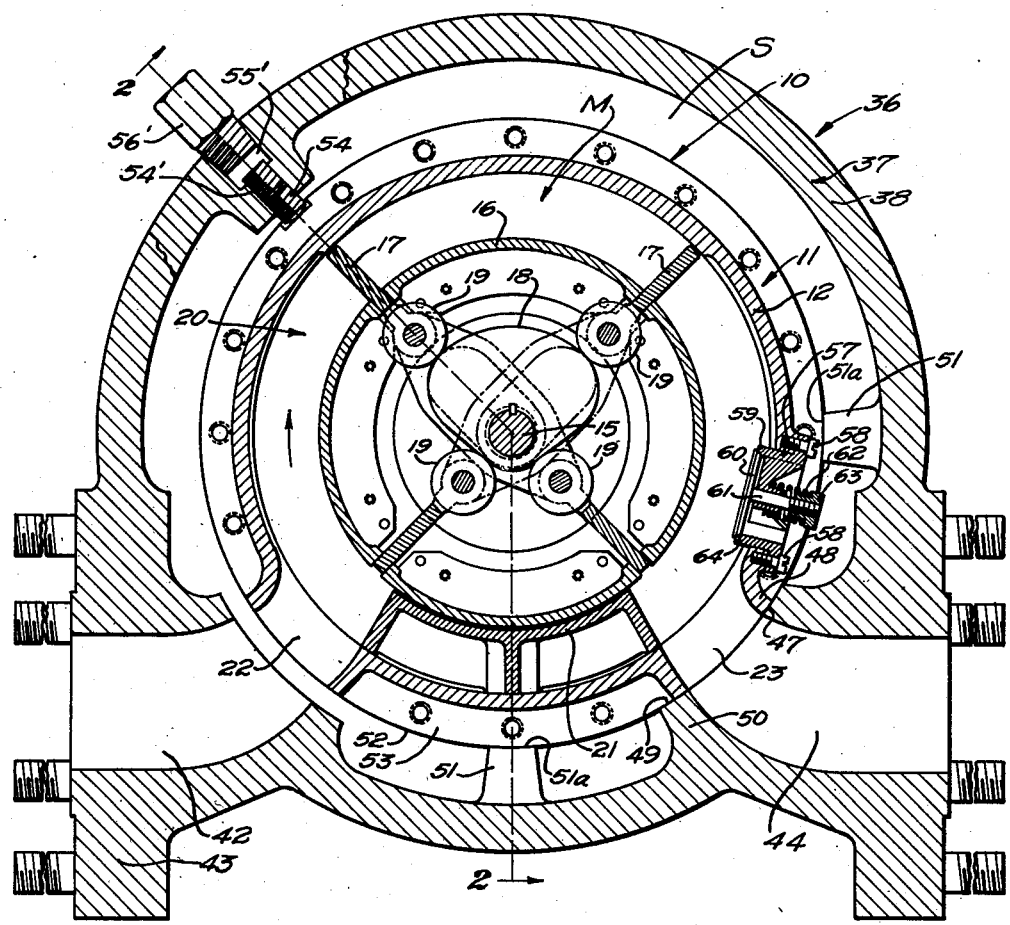
Fig. 1 is a transverse, horiozntal section through a device embodying the invention.

Though this is not controlling on the invention the meter mechanism generally indicated at 10 is illustrated as being similar, in principle, to certain of the meters shown in Patent No. 2,207,182, dated July 9, 1940, and entitled Fluid flow mechanism. This mechanism is made up of a housing indicated at 11 consisting of a cylindrical barrel 12, bottom plate 13 and top plate 14. A coaxial shaft 15 is supported in housing 11 and carries, for rotation, a rotor 16 which, in turn, supports blades 17. A stationary cam 18 coacts with blade rollers 19 to cause the blades to shuttle transversely to flow channel 20 due to rotor-rotation as set up by flow of fluid in a clockwise direction as viewed in Fig. 1.

An arcuate abutment 21 secured to barrel 12 and projecting across channel 20, separates the inlet and outlet 22 and 23, respectively, of that flow channel, the blades and cam being so constructed that each blade is radially retracted as it passes the abutment, all as will be readily understood.

The measuring chamber of the meter is that portion M of the flow channel which extends between two fully projected blades when they are in the position of Fig. 1, it being understood that any registering mechanism taking its power from rotor 16 is, in effect a rotor revolution counter, the registering mechanism being calibrated in any desired volumetric unit and in consonance with the volume of fluid represented by the amount passed through the measuring chamber per revolution of the rotor.

The drive connection between the rotor and the registering mechanism indicated at R, so far as its is carried by the structure thus far described, embodies a pinion 24 on rotor 16 meshing with a gear 25 on shaft 26, the latter extending vertically through the packing 27 in head 14. The upper end of shaft 26 carries a change-gear 28 meshing with gear 29 supported for rotation on stud shaft 30, the latter being carried in axial alinement with shaft 15 by cap 31. In the illustrated embodiment, though this is not limitative on the invention, shaft 15 is stationarily held to housing 11.

Gear 29 carries one-half of a loose clutch generally indicated at 33. It comprises a hub 34 carrying diametrically opposite clutch pins 35.

The outer casing of the meter is indicated generally at 36 and consists of a bowl 37 having a cylindric wall-portion 38 and a bottom portion 39. A removable head is indicated at 40, attachment studs and bolts being shown at 41. An inlet opening 42 through bowl-boss 43 opens to the interior of the bowl, being in angular registration with but spaced radially from inlet 22. The outlet opening 44 of the bowl is in direct communication with outlet 23.

With head 40 removed, the entire meter-mechanism 10 may be lowered to place within bowl 37, in which position the meter-mechanism and bowl are substantially concentric. The lower head 13 of housing 11, carries vertical posts 45 which rest on lugs 46 rising from base 39. The end 47 of inner casing boss or tubular neck 48 is arcuately machined to snugly fit the arcuate face 49 of boss 50, the latter being provided internally of the bowl and about outlet 44. Radial positioning lugs 51 on bowl 37 are arranged adjacent but at opposite sides of boss 50, their inner faces 51a being accurately machined to engage the turned, peripheral faces 52 of flanges 53.

Radial thrust screws 54 are threaded through wall 38 of the bowl at a point approximately diametrically opposite boss 50, serving to snugly position housing 11 against boss 50 and lugs 51 so the previously mentioned finished faces of the members are in tight arcuate engagement, thus insuring a normal flow from outlet 23 through outlet 44 and holding housing 11 against horizontal shift within the bowl. Screws 54 also extend into directly overlying relation with shoulders 55 at the bottom of slots 56 provided in flanges 53, thus serving to hold housing 11 down with legs 45 in snug engagement with bosses 46, though the clamping effect of the screws in a radial direction also aid as hold-down means.

Lock screws 54' may be threaded in behind screws 54, and the enlarged bores 55' through which access may be had to the screws, are closed by threaded plugs 56'. A drain plug 57' may be provided in the base 39.

It will be seen that fluid entering inlet 42 will fill the space S between housing 11 and housing 36 but its only free passage of flow will be through inlet 22, flow passage 20 and outlets 23, 44, the flow through this course acting on blades 17 to rotate the rotor and thus, through the drive connection previously specified, driving gear 29 and clutch member 33.

An opening 57 is made through the barrel 12 of housing 11 adjacent port 23. Arranged in this opening and bolted at 58 to barrel 12 is a valve cage 59 carrying a valve head 60 on stem 61. A spring 62 acts between the cage and stem head 63 in a manner constantly tending to hold head or stopper 60 on the cage seat 64.

Under normal conditions, spring-loaded stopper 60 will remain closed and fluid in passage 20 will merely pass by the valve and out through outlets 23—44. However, should the rotor jam or be unduly retarded, the pressure within space S will be built up over and above the pressure of the fluid between abutment 21 and the next adjacent projected blade to the right thereof, and the preponderant pressure in space S will thus open valve 60 and the fluid from that space may thus pass through outlets 23—44. The passage of the fluid through this course is, in effect, a by-passage around the rotor and thus permits the rotor to be stalled without danger of damaging or wrecking it, as would otherwise be the case.

It will be seen that the angular spacing between port 23 and valve 60 is less than the angular spacing between that port and the next adjacent fully projected blade 17, so it is assured that, irrespective of the position of the rotor, the by-pass will always be effective if the rotor stalls.

On top of head 40 is bolted a housing or cap 70 which, in turn, carries externally the registering mechanism R, the lower end of the register actuating shaft being indicated at 71 and carrying cross pins 72 making up one-half of the loose clutch indicated at 73. The drive of clutch 73 from clutch member 33 must, of course, pass through head 40, and since the space S' between heads 14 and 40 is in communication with space S with the result that fluid fills the space S', packing means must be provided for preventing the leakage of fluid around the drive connection as it passes through head 40. This means is indicated generally at 74, the details thereof being shown and claimed in the aforementioned co-pending application. It will suffice here to say that packing means 74 is provided about spindle 75, the latter having end-heads 76 and 77. Head 76 is the upper half of clutch 33, while head 77 is the lower half of clutch 73.

Head 76 is provided with pins 84 which are adapted to be engaged by pins 35 when gear 29 is rotated, though there is sufficient capacity for play between pins 35 and 84 to give proper loose-clutch characteristics and to provide for any misalinement of clutch members.

While I have shown and described a preferred embodiment of my invention, various changes in design, structure and arrangement may be made without departing from the spirit and scope of the appended claim.

I claim:

In a fluid flow mechanism, a housing comprising an inner wall and an outer wall, each wall being provided with an inlet and an outlet, said walls being spaced apart to provide a fluid receiving space therebetween, a rotor supported for rotation within the inner wall, said rotor having angularly spaced blades adapted to shuttle radially to and from positions of projection across a flow channel defined within said inner wall, the inlet and outlet of the inner wall opening to said flow channel, the inlets of both walls opening to said space, the outlets of the two walls being in direct connection so fluid in said flow channel is normally adapted to flow directly out through both outlets, and a normally closed valve in the inner wall and spaced angularly from the inner wall outlet a distance less than the angularly measured distance between the inner wall outlet and the next adjacent fully projected blade, spring means normally and yieldingly holding the valve closed, said valve being adapted to open automatically to permit passage of fluid from said space into the flow channel and thence to the outlet of the outer wall when a predetermined pressure differential exists at opposite sides of the valve.

WILLIAM E. STEEN.